US 8,792,827 B2

(12) United States Patent
Sakata

(10) Patent No.: US 8,792,827 B2
(45) Date of Patent: Jul. 29, 2014

(54) SHORT RANGE WIRELESS COMMUNICATION APPARATUS

(75) Inventor: Ryuuji Sakata, Kariya (JP)

(73) Assignee: Denso Corporation, Kariya (JP)

( * ) Notice: Subject to any disclaimer, the term of this patent is extended or adjusted under 35 U.S.C. 154(b) by 244 days.

(21) Appl. No.: 13/535,896

(22) Filed: Jun. 28, 2012

(65) Prior Publication Data

US 2013/0005264 A1     Jan. 3, 2013

(30) Foreign Application Priority Data

Jun. 30, 2011   (JP) .................................. 2011-145780

(51) Int. Cl.
   *H04B 7/00*        (2006.01)
(52) U.S. Cl.
   USPC ...................................... 455/41.2; 455/569.2
(58) Field of Classification Search
   USPC ......... 455/41.2, 569.1, 569.2, 41.3, 512, 574, 455/343.1, 343.2
   See application file for complete search history.

(56) References Cited

U.S. PATENT DOCUMENTS

| | | | |
|---|---|---|---|
| 6,687,517 B2 * | 2/2004 | Kinnunen | 455/569.1 |
| 7,050,834 B2 * | 5/2006 | Harwood et al. | 455/563 |
| 7,162,276 B2 * | 1/2007 | Iwase | 455/569.1 |
| 7,660,578 B2 * | 2/2010 | Viitamaki et al. | 455/426.2 |
| 8,620,217 B2 * | 12/2013 | Saito et al. | 455/41.2 |
| 2007/0129116 A1 * | 6/2007 | Katoh et al. | 455/569.1 |
| 2008/0220718 A1 | 9/2008 | Sakamoto et al. | |
| 2009/0032581 A1 | 2/2009 | Esslinger et al. | |
| 2011/0237191 A1 | 9/2011 | Saito et al. | |
| 2013/0052955 A1 * | 2/2013 | Tamura | 455/41.2 |

FOREIGN PATENT DOCUMENTS

| | | |
|---|---|---|
| CN | 1979212 | 6/2007 |
| JP | 2003-087359 | 3/2003 |
| JP | 2006-352522 | 12/2006 |
| JP | 2006-352799 | 12/2006 |
| JP | 2009-124463 | 6/2009 |
| JP | 2010-010876 | 1/2010 |
| JP | 2010-028602 | 2/2010 |
| JP | 2011-018975 | 1/2011 |

OTHER PUBLICATIONS

Office action dated Apr. 23, 2013 in corresponding Japanese Application No. 2011-145780.
Office action dated Mar. 3, 2014 in corresponding Chinese Application No. 2012 10225345.8.
Office Action (referencing art cited above) issued Jul. 9, 2013 in Japanese Application No. 2011-145783 (with English translation) corresponding to co-pending U.S. Appl. No. 13/535,765.

* cited by examiner

*Primary Examiner* — Sonny Trinh
(74) *Attorney, Agent, or Firm* — Harness, Dickey & Pierce, PLC

(57) ABSTRACT

A short range wireless communication apparatus includes: a connection device that connects with an external apparatus via a short range wireless communication line according to a data communication protocol for defining data communication, wherein the external apparatus switches to a normal mode from a power-saving mode under a condition that the external apparatus receives a power-saving mode release signal from the short range wireless communication apparatus while the external apparatus operates in the power-saving mode; a transmission device that transmits the power-saving mode release signal to the external apparatus; and a control device that controls the transmission device to transmit the power-saving mode release signal to the external apparatus when the control device determines that the connection device connects with the external apparatus according to the data communication protocol.

12 Claims, 7 Drawing Sheets

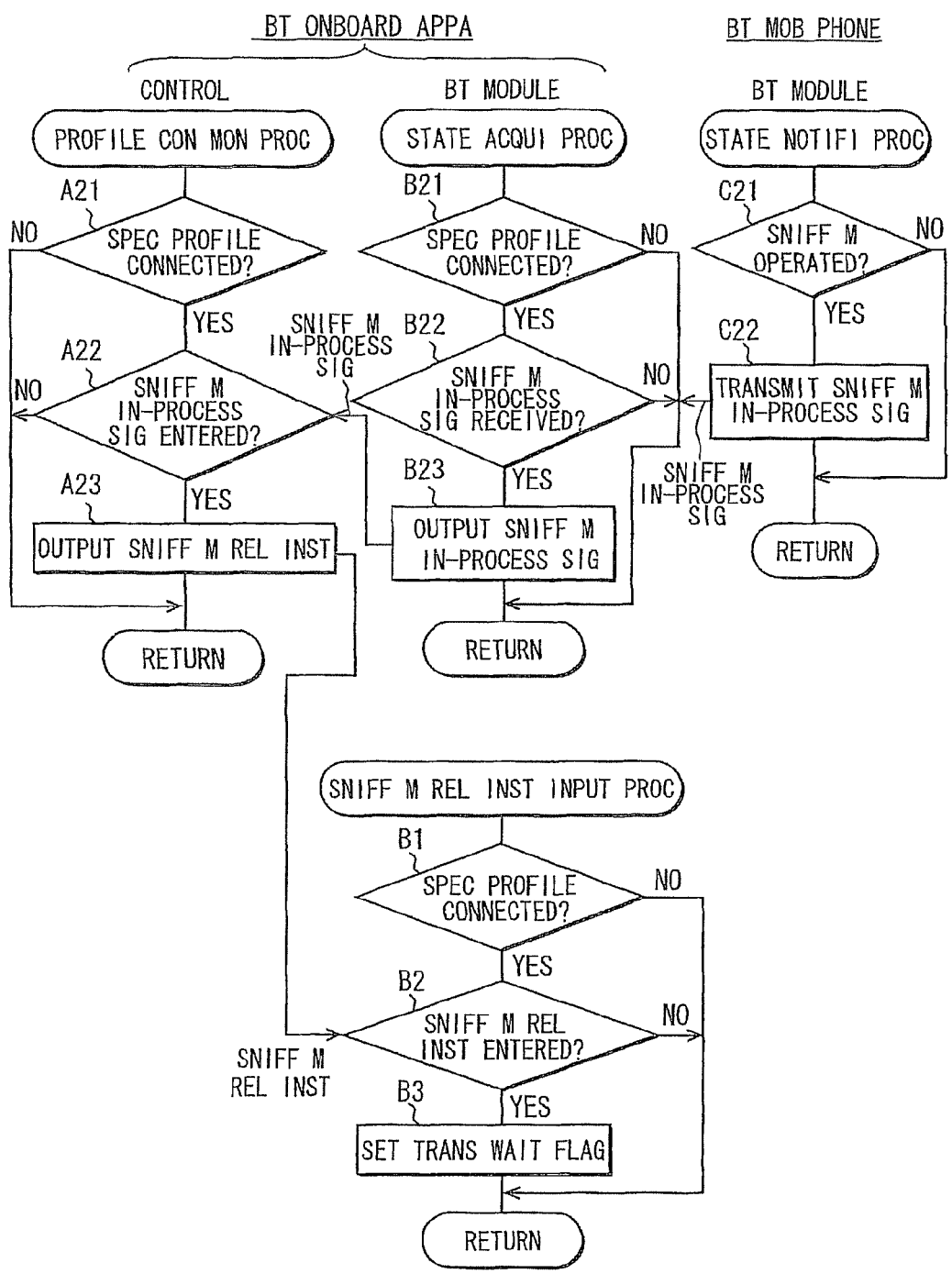

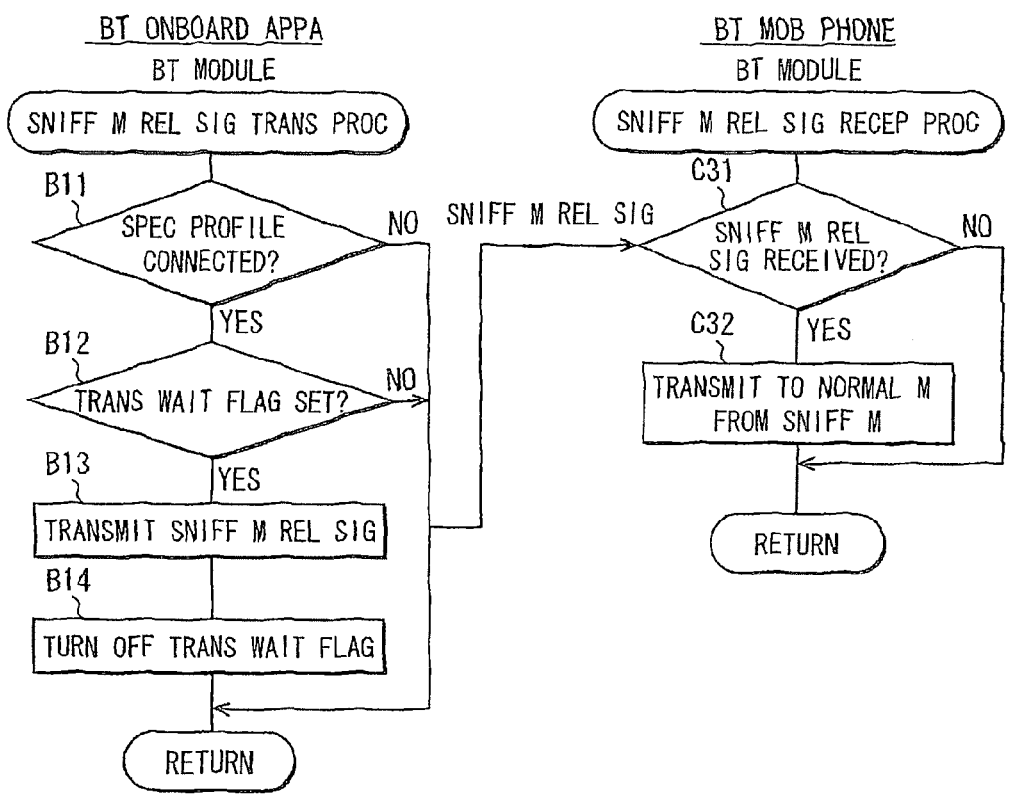

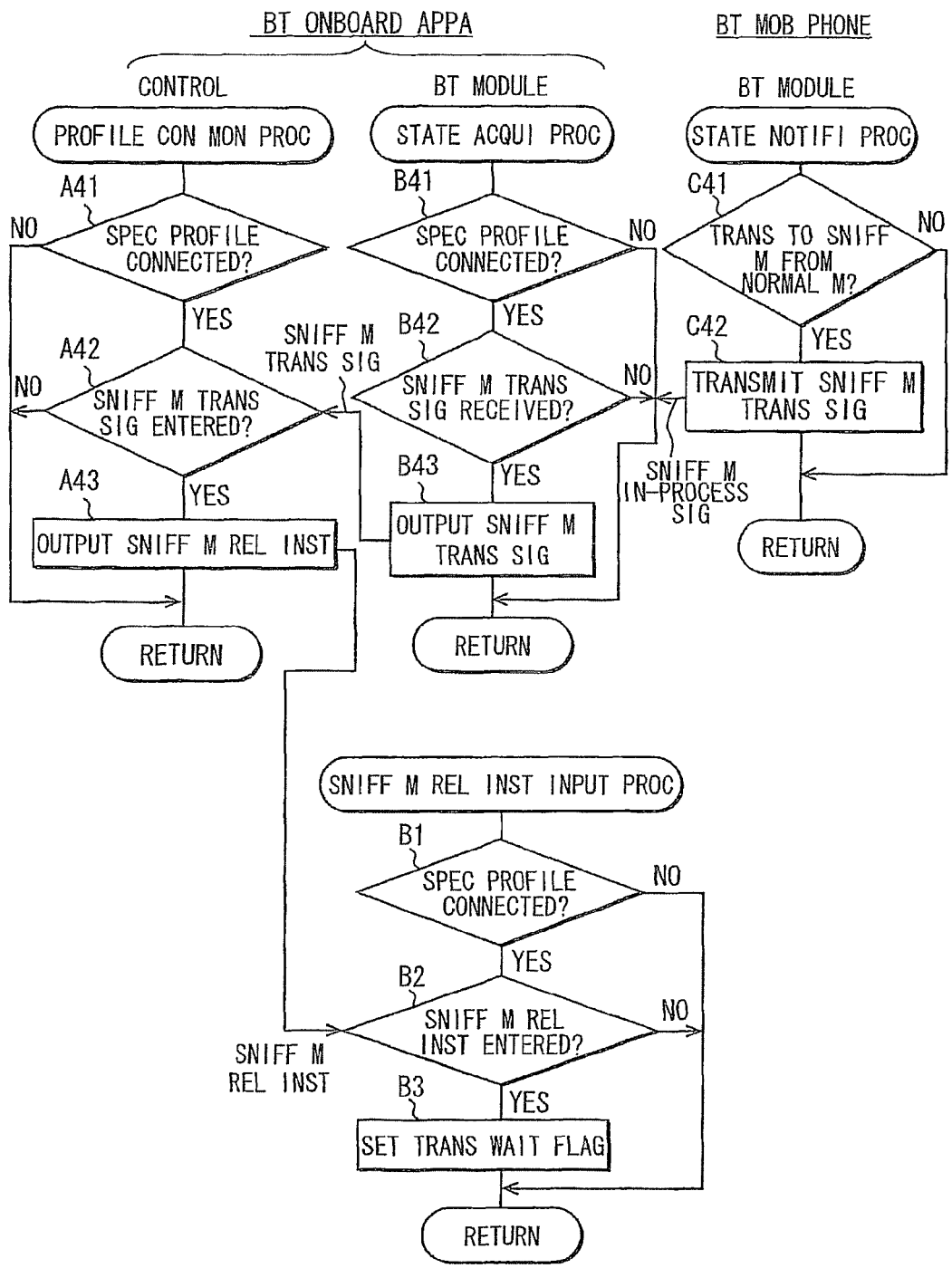

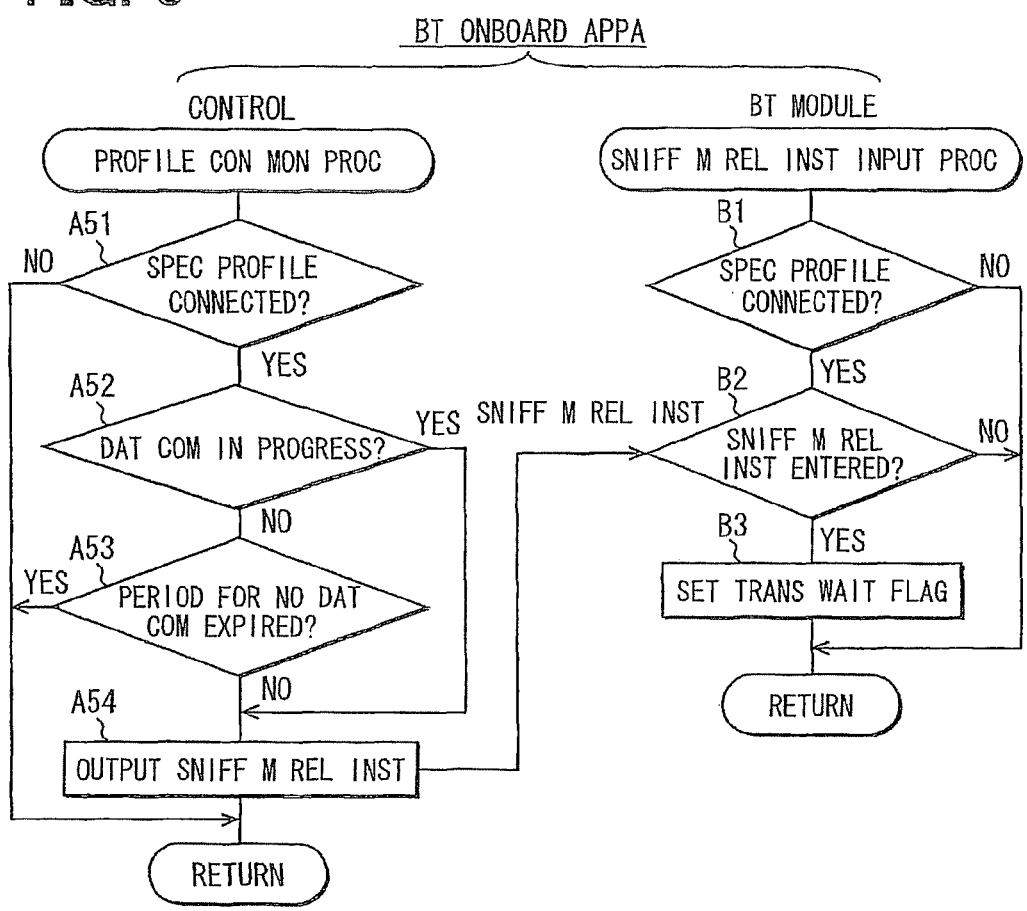

SHORT RANGE WIRELESS COMMUNICATION APPARATUS

CROSS REFERENCE TO RELATED APPLICATION

This application is based on Japanese Patent Application No. 2011-145780 filed on Jun. 30, 2011, the disclosure of which is incorporated herein by reference.

TECHNICAL FIELD

The present disclosure relates to a short range wireless communication apparatus having a connection portion that connects a data communication protocol for data communication regulation to a communication-party apparatus through a short range wireless communication line. The communication-party apparatus changes from a power-saving mode to a normal mode if the communication-party apparatus receives a power-saving mode release signal while operating in the power-saving mode.

BACKGROUND

A short range wireless communication module is provided for an electronic device such as a mobile telephone having a short range wireless communication function. According to specifications, the short range wireless communication module can transition (switch) between a normal mode (non-power-saving mode) and a power-saving mode (low-power consumption mode) that consumes less power than the normal mode. This type of short range wireless communication module transitions from the normal mode to the power-saving mode to suppress the power consumption if a user performs no input operation in the normal mode within a predetermined period (e.g., see patent document 1).
Patent Document 1: JP-A-2003-87359

The power-saving mode consumes less power than the normal mode. However, the power-saving mode processes data more slowly than the normal mode. The short range wireless communication apparatus has the short range wireless communication function. The short range wireless communication module of the communication-party apparatus can transition between the normal mode and the power-saving mode. The short range wireless communication module may issue a request to start data communication in the power-saving mode. In such a case, the short range wireless communication module processes the data communication in the power-saving mode. As a result, the short range wireless communication module slows the data communication process. The data communication rate decreases between the short range wireless communication apparatus and the communication-party apparatus.

SUMMARY

It is an object of the present disclosure to provide a semiconductor device.

According to an aspect of the present disclosure, a short range wireless communication apparatus includes: a connection device that connects with an external apparatus via a short range wireless communication line according to a data communication protocol for defining data communication, wherein the external apparatus switches to a normal mode from a power-saving mode under a condition that the external apparatus receives a power-saving mode release signal from the short range wireless communication apparatus while the external apparatus operates in the power-saving mode; a transmission device that transmits the power-saving mode release signal to the external apparatus; and a control device that controls the transmission device to transmit the power-saving mode release signal to the external apparatus when the control device determines that the connection device connects with the external apparatus according to the data communication protocol.

In the above apparatus, the power-saving mode release signal is transmitted while the data communication protocol is connected between the connection device and the external apparatus as a communication-party apparatus, that is, while data communication is likely to occur between both based on the data communication protocol. Even if the external apparatus as a data communication party is operating in the power-saving mode, the external apparatus can fast transition (return) to the normal mode from the power-saving mode and operate in the normal mode. As a result, this enables to fast solve a problem if occurred due to the external apparatus operating in the power-saving mode.

BRIEF DESCRIPTION OF THE DRAWINGS

The above and other objects, features and advantages of the present disclosure will become more apparent from the following detailed description made with reference to the accompanying drawings. In the drawings:

FIG. 3 is a flowchart showing processes performed by an onboard apparatus and a mobile telephone;

FIG. 4 is another flowchart showing processes performed by an onboard apparatus and a mobile telephone;

FIG. 5 is another flowchart showing processes performed by an onboard apparatus and a mobile telephone;

FIG. 6 is another flowchart showing processes performed by an onboard apparatus and a mobile telephone.

DETAILED DESCRIPTION

Figure 1:
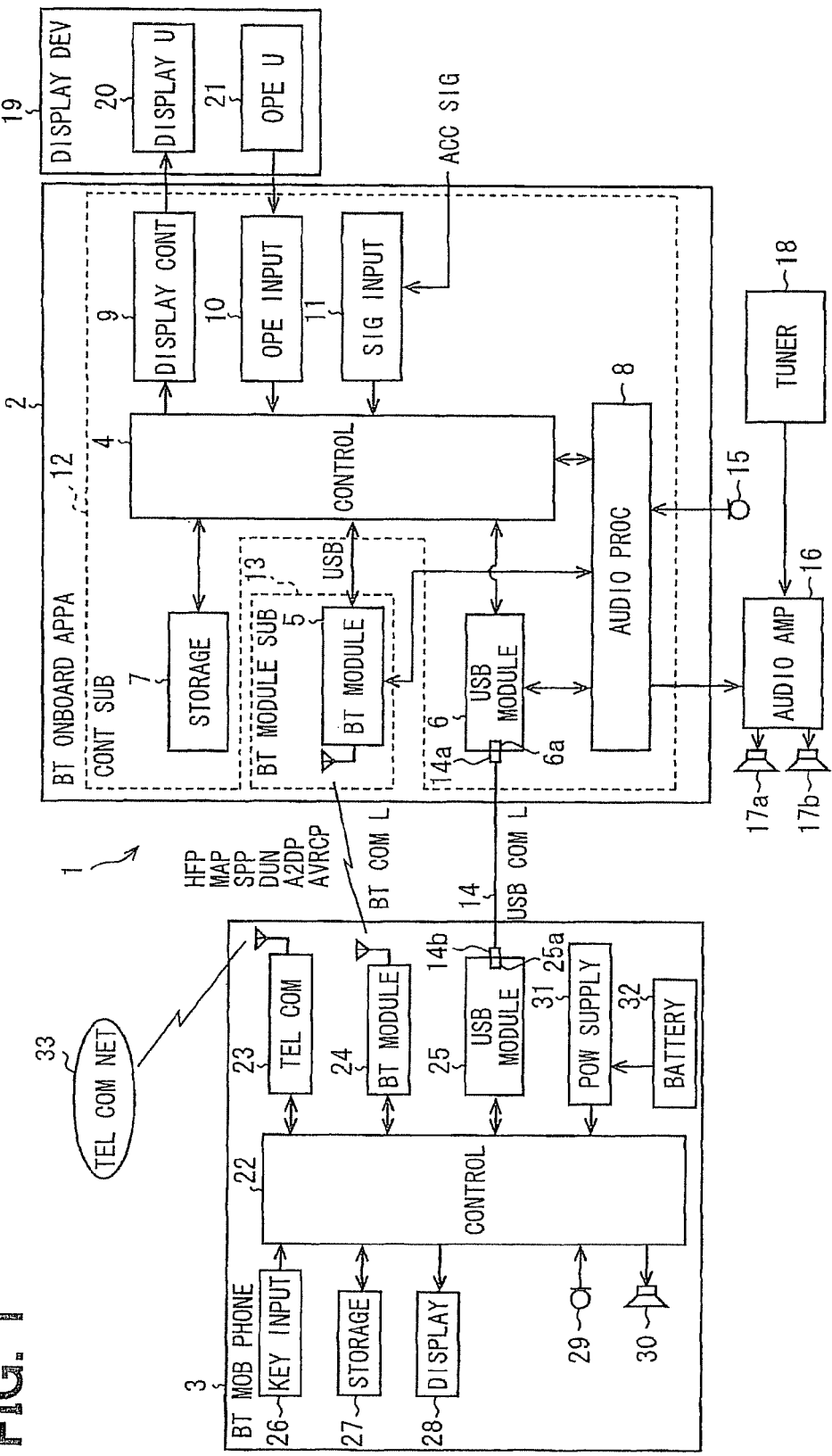
FIG. 1 is a function block diagram showing an embodiment of the disclosure.

With reference to the accompanying drawings, the following describes an embodiment of the disclosure applied to an onboard apparatus compliant with Bluetooth (trademark, hereinafter referred to as BT) provided with a BT communication function. The embodiment assumes the following. The onboard apparatus is mounted in a vehicle compartment. A BT-compliant mobile telephone (hereinafter referred to simply as a mobile telephone) provided with the BT communication function is carried into the vehicle compartment. The onboard apparatus is capable of BT communication with the mobile telephone.

A BT communication system 1 includes an onboard apparatus 2 (equivalent to a short range wireless communication apparatus according to the disclosure) mounted on a vehicle and a mobile telephone 3 (equivalent to a communication-party apparatus according to the disclosure) carried into a vehicle compartment. The onboard apparatus 2 is provided with a control portion 4 (equivalent to a control means according to the disclosure), a BT module 5 (equivalent to a connection means and a transmission means according to the disclosure), a USB (Universal Serial Bus) module 6, a storage portion 7, an audio processing portion 8, a display control portion 9, an operation input portion 10, and a signal input portion 11. The control portion 4, the USB module 6, the storage portion 7, the audio processing portion 8, the display control portion 9, the operation input portion 10, and the signal input portion 11 are physically mounted on a control substrate 12. The BT module 5 is physically mounted on a BT module substrate 13 that is provided as a member different from the control substrate 12. The control portion 4 and the BT module 5 are connected through a USB.

The control portion 4 is provided as a known computer including a CPU, RAM, ROM, and an I/O bus. The control portion 4 controls overall operations such as communication operations and data management operations for the onboard apparatus 2. The BT module 5 has a function that connects a BT communication line (equivalent to a short range wireless communication line according to the disclosure) with a BT module of the mobile telephone 3 (to be described) and performs BT communication through the BT communication line. The ET module 5 can simultaneously connect multiple profiles (multi-connection) specified in the BT communication standard. For example, the profiles include: HFP (Hands Free Profile) that specifies hands-free conversation; MAP (Message Access Profile) that specifies e-mail data; SPP (Serial Port Profile) that specifies data communication available for virtual serial ports; DUN (Dial-up Networking Profile) that specifies dial-up connection to the Internet; A2DP (Advanced Audio Distribution Profile) that specifies audio data transfer; and AVRCP (Audio/Video Remote Control Profile) that specifies transfer of control data concerning audio data control. The HFP, MAP, SPP, DUN, A2DP, and AVRCP signify data communication protocols defined for the corresponding functions. In addition to HFP, MAP, SPP, DUN, A2DP, and AVRCP, the BT module 5 may be connectible with PBAP (Phone Book Access Profile) and OPP (Object Push Profile) that specify phone book data transfer.

The USB module 6 has a connection terminal 6a attachable to and detachable from a connection terminal 14a of a USB connection cable 14. Let us suppose that one connection terminal 14a of the USB connection cable is connected to the connection terminal 6a and the other connection terminal 14b of the USB connection cable 14 is connected to a USB module connection terminal of the mobile telephone 3 (to be described). In this state, the USB module 6 has a function that connects the USB communication line with the USB module of the mobile telephone 3 and enables USB communication using the USB communication line.

The storage portion 7 includes a storage area that stores various data. The storage portion 7 stores e-mail data transferred from the mobile telephone 3 to the BT module 5 that connects MAP with the BT module of the mobile telephone 3. The e-mail data includes the following information: the sender of the e-mail; the date and time when the mobile telephone 3 received the e-mail; the type of e-mail; and the e-mail subject entered by the sender. The storage portion 7 stores phone book data, call origination data, and call termination data when the BT module 5 connects PBAP with the BT module of the mobile telephone 3. The phone book data is transferred from the mobile telephone 3 to the BT module 5. The call origination data shows correspondence between the call origination time and the call origination telephone number associated with a call origination operation from the onboard apparatus 2 or a call origination operation from the mobile telephone 3 that connects HFP with the onboard apparatus 2. The call termination data shows correspondence between the call termination time and the call termination telephone number associated with a call termination operation at the mobile telephone 3 that connects HFP with the onboard apparatus 2.

The audio processing portion 8 connects with a microphone 15 that is provided in the vehicle compartment and is positioned near a steering unit where the voice uttered from a user can be easily collected, for example. The audio processing portion 8 also connects with an audio amplifier 16 provided outside the onboard apparatus 2. The audio amplifier 16 connects with speakers 17a and 17b.

Let us suppose that HFP is connected between the BT module 5 and the BT module of the mobile telephone 3 (to be described). In this state, when the microphone 15 inputs the voice uttered from the user as transmission voice data, the audio processing portion 8 processes the input transmission voice data and outputs the processed data to the BT module 5. When the BT module 5 inputs reception voice data, the audio processing portion 8 outputs the input reception voice data to the audio amplifier 16.

The A2DP and AVRCP connections may be established between the BT module 5 and the BT module of the mobile telephone 3 (to be described). In this case, the A2DP and AVRCP connections transfer audio data from the BT module of the mobile telephone 3 to the BT module 5. The audio processing portion 8 outputs the transferred audio data to the audio amplifier 16. The USB communication may be available between the USB module 6 and the USB module of the mobile telephone 3 (to be described). In this case, the USB communication line transfers audio data from the USB module of the mobile telephone 3 to the USB module 6. The audio processing portion 8 outputs the transferred audio data to the audio amplifier 16.

The audio amplifier 16 is supplied with the reception voice data or audio data from the audio processing portion 8. The audio amplifier 16 then amplifies the supplied reception voice data or audio data and outputs it from the speakers 17a and 17b. The audio amplifier 16 also connects with a tuner deck 18. The tuner deck 18 supplies the audio amplifier 16 with music data reproduced from a music recording medium, for example. The audio amplifier 16 also amplifies the supplied music data and outputs it from the speakers 17a and 17b.

A display apparatus 19 includes a display unit 20 and an operation unit 21. The display unit 20 displays various display screens. The operation unit 21 forms a touch switch on the display screen. When supplied with a display instruction signal from the control portion 4, the display control portion 9 controls display operations of the display unit 20 in the display apparatus 19 based on the supplied display instruction signal. The operation input portion 10 is supplied with an operation detection signal from the operation unit 21 when a user operates a touch switch formed on the display screen. The operation input portion 10 outputs the supplied operation detection signal to the control portion 4. The control portion 4 analyzes the operation detection signal supplied from the operation input portion 10 and specifies the user operation.

The signal input portion 11 is connected to an ACC (accessory) switch mounted on the vehicle. The signal input portion 11 is supplied with an ACC signal supplied from the ACC switch and outputs the supplied ACC signal to the control portion 4. The control portion 4 turns on or off the apparatus power supply based on the ACC signal supplied from the signal input portion 11. That is, the control portion 4 turns on the apparatus power supply (to start the vehicular communication apparatus 2) when the ACC signal transitions from the off-state to the on-state. The control portion 4 turns off the apparatus power supply (to stop the vehicular communication apparatus 2) when the ACC signal transitions from the on-state to the off-state.

The mobile telephone 3 includes a control portion 22, a telephone communication portion 23, a BT module 24, a USB module 25, a key input portion 26, a storage portion 27, a display portion 28, a microphone 29, a speaker 30, and a power supply portion 31.

The control portion 22 includes a CPU, RAM, ROM, and an I/O bus used for a known microcomputer, and controls operations in general such as communication and data management of the mobile telephone 3. The telephone communication portion 23 performs telephone communication with a telephone communication network 33. The telephone communication network 33 includes facilities such as a mobile telephone base station and a base station control apparatus that provide known mobile telephone communication services. The BT module 24 has a function that connects a BT communication line with the BT module 5 of the onboard apparatus 2 and performs BT communication through the BT communication line. The BT module 24 can simultaneously connect multiple profiles such as HFP, MAP, SPP, DUN, A2DP, and AVRCP specified in the BT communication standard.

The USB module 25 includes a connection terminal 25a attachable to and detachable from the connection terminal 14b of the USB connection cable 14. Let us suppose that one connection terminal 14a of the USB connection cable 14 is connected to the connection terminal 6a of the USB module 6 of the onboard apparatus 2 and the other connection terminal 14b of the USB connection cable 14 is connected to the connection terminal 25a. In this state, the USB module 25 provides a function that connects the USB communication line with the USB module 6 of the onboard apparatus 2 and performs USB communication using the USB communication line.

The key input portion 26 includes various keys the user can operate. When the user operates a key, the key input portion 26 outputs the corresponding operation detection signal to the control portion 22. The control portion 22 analyzes the operation detection signal supplied from the key input portion 26 and identifies the user operation. The storage portion 27 includes a storage area that stores various data. The display portion 28 is supplied with a display instruction signal from the control portion 22 and displays various display screens based on the supplied display instruction signal. The microphone 29 supplies the control portion 22 with the voice uttered from a user as transmission voice data. The control portion 22 processes the supplied transmission voice data. The telephone communication portion 23 supplies the control portion 22 with reception voice data. The control portion 22 outputs the supplied reception voice data as the voice from the speaker 30. The power supply portion 31 supplies the power discharged from a battery 32 as operating power to respective function blocks. The battery 32 is attachable to and detachable from the mobile telephone body.

According to the above-mentioned configuration, the BT module 24 of the mobile telephone 3 is equivalent to a data communication party for the BT module 5 of the onboard apparatus 2. The BT module 24 is powered from the battery 32 and is activated. In this state, the BT module 24 can operate while transitioning (switching) between the normal mode (non-power-saving mode) and the power-saving mode (low-power consumption mode). The power-saving mode consumes less power than the normal mode but processes data more slowly than the normal mode. According to the BT communication standard, the power-saving mode includes hold mode, sniff mode, and park mode. The BT module 24 saves power while transitioning from the normal mode to any of the hold mode, the sniff mode, and the park mode. The BT module 24 can transition from the normal mode to the hold mode if the BT module 24 operates as any of a master (BT module having the control function) and a slave (BT module other than the master). The BT module 24 can transition from the normal mode to the sniff mode and the park mode only if the BT module 24 operates as the slave.

In the mobile telephone 3, the BT module 24 may detect that a user makes no input to the key input portion 26 for a predetermined time interval. The control portion 22 then allows the BT module 24 to transition from the normal mode to the power-saving mode. After that, the BT module 24 transitions (returns) to the normal mode from the power-saving mode under the condition that the BT module 24 receives a power-saving mode release signal from the outside via the BT communication line. In addition to the condition, the BT module 24 also transitions from the power-saving mode to the normal mode when the user operates the key input portion 26 to release the power-saving mode.

As described above, the BT module 5 of the onboard apparatus 2 has the function that simultaneously connects HFP, MAP, SPP, DUN, A2DP, and AVRCP with the BT module 24. In addition, the BT module 5 has a function that transmits the power-saving mode release signal to the BT module 24 via the BT communication line when the control portion inputs a power-saving mode release instruction.

According to the above-mentioned configuration, for example, the user may use the operation unit 21 for an operation related to data communication with the mobile telephone 3 while the SPP is connected between the BT modules 5 and 24. In this case, the SPP transfers data related to the user operation between the BT modules 5 and 24. That is, the SPP is equivalent to a data communication protocol that specifies data communication of data related to user operations according to the disclosure.

The communication network 33 may terminate a call to the mobile telephone 3 while the HFP is connected between the BT modules 5 and 24. In this case, the HFP transfers incoming call notification data from the BT module 24 to the BT module 5. Using the incoming call notification data, the mobile telephone 3 notifies the onboard apparatus 2 that the call termination has occurred. An e-mail message may arrive at the mobile telephone 3 from the communication network 33 while the MAP is connected between the BT modules 5 and 24. In this case, the MAP transfers incoming e-mail notification data from the BT module 24 to the BT module 5. Using the incoming e-mail notification data, the mobile telephone 3 notifies the onboard apparatus 2 that the e-mail has arrived. That is, the HFP and the MAP each are equivalent to a data communication protocol that specifies data communication of data indicating call termination from the communication network to the communication-party apparatus according to the disclosure.

For example, the user may use the operation unit 21 for an operation related to dial-up connection from the mobile telephone 3 to the communication network 33 while the DUN is connected between the BT modules 5 and 24. In this case, the DUN transfers data needed for the dial-up connection between the BT modules 5 and 24. That is, the DUN is equivalent to a data communication protocol that specifies data communication of data needed for the connection between the communication-party apparatus and the communication network.

The following describes effects of the above-mentioned configuration with reference to FIGS. 2 through 7. FIGS. 2 through 7 are flowcharts showing processes performed by the control portion 4 and the BT module 5 of the onboard apparatus 2 and processes performed by the BT module 24 of the mobile telephone 3. As preconditions for the description, the BT module 24 of the mobile telephone 3 operates in the sniff mode as the power-saving mode. The BT module 24 transitions (returns) to the normal mode from the sniff mode when the BT module 24 receives a sniff mode release signal as the power-saving mode release signal from the outside.

According to the embodiment, the control portion 4 of the onboard apparatus 2 allows the BT module 5 to transmit the sniff mode release signal to the BT module 24 of the mobile telephone 3 under the following conditions.

(1) A specific profile is connected between the BT modules 5 and 24 and a predetermined transmission timing cycle is reached.

(2) A specific profile is connected between the BT modules 5 and 24 and the BT module 24 is operating in the sniff mode.

(3) A specific profile is connected between the BT modules 5 and 24 and the BT module 24 transitions from the normal mode to the sniff mode.

(4) A specific profile is connected between the BT modules 5 and 24 and data communication is performed between the BT modules 5 and 24 or no data communication does not exceed a predetermined period.

(5) A specific profile is connected between the BT modules 5 and 24 and the battery 32 of the mobile telephone 3 is being charged or the battery 32 thereof satisfies a predetermined charging capacity or more.

These conditions are described below.

Figure 2A:
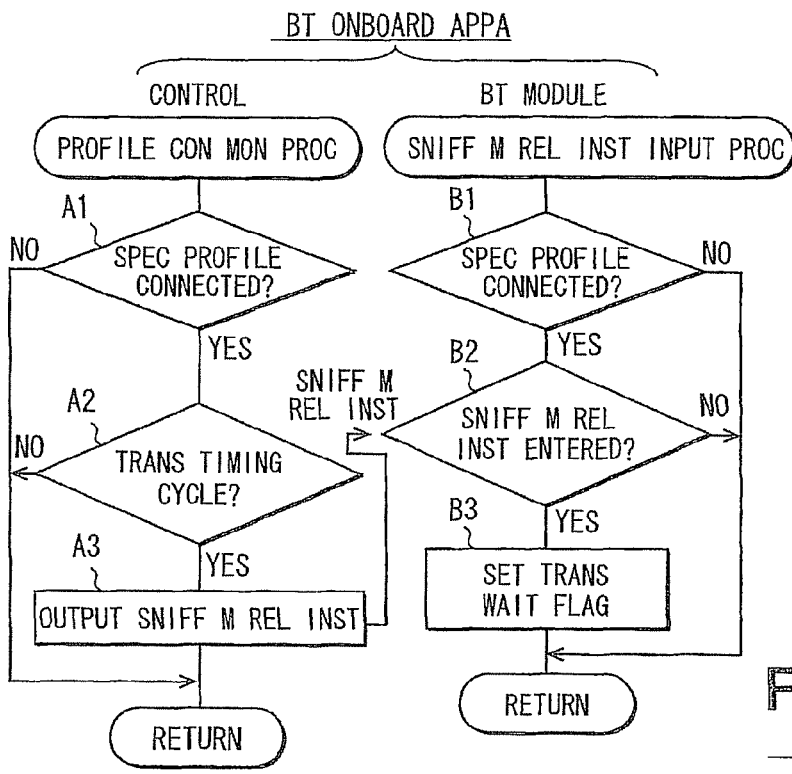
FIGS. 2A and 2B are flowcharts showing processes performed by an onboard apparatus and a mobile telephone, respectively.
Figure 2B:
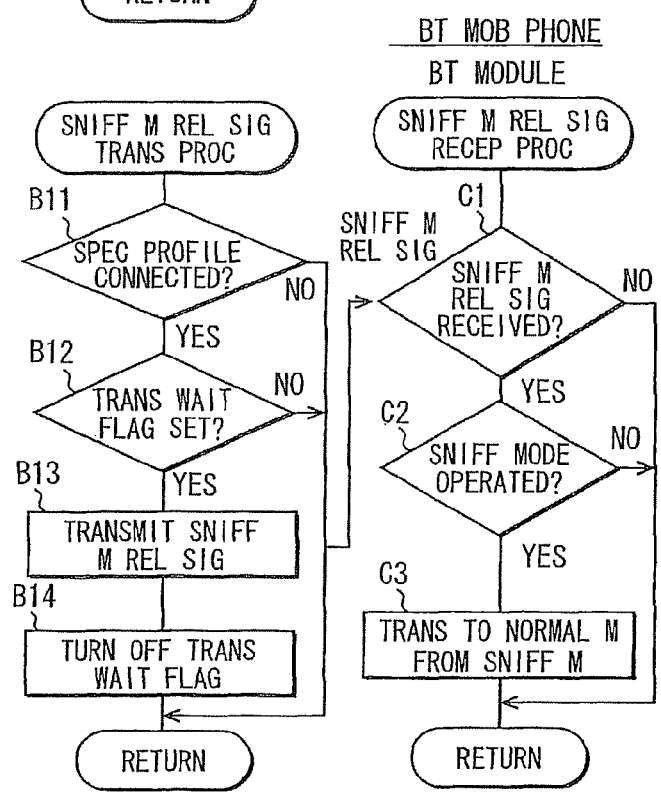

(1) A specific profile is connected between the BT modules 5 and 24 and a predetermined transmission timing cycle is reached (see FIGS. 2A AND 2B).

If the onboard apparatus 2 is turned on (ACC switch turned on), the control portion 4 of the onboard apparatus 2 performs a main process. As a sub-process of the main process, the control portion 4 periodically performs a profile connection monitoring process at a specified cycle. If the onboard apparatus 2 is turned on, the BT module 5 of the onboard apparatus performs a main process. As a sub-process of the main process, the BT module 5 periodically performs a sniff mode release instruction input process and a sniff mode release signal transmission process at a specified cycle. The control portion 4 and the BT module 5 of the onboard apparatus 2 may synchronously perform the main processes and the sub-processes. If the mobile telephone 3 is turned on, the BT module 24 of the mobile telephone 3 performs a main process. As a sub-process of the main process, the BT module 24 periodically performs a sniff mode release signal reception process at a specified cycle.

In the onboard apparatus 2, the control portion 4 changes the main process to the profile connection monitoring process and starts it to check the profile connection state of the BT module 5. The control portion 4 determines whether a specific profile (e.g., SPP) is connected between the BT modules 5 and 24 (step A1). The control portion 4 may determine that a specific profile is connected between the BT modules 5 and 24 (YES at step A1). The control portion 4 then determines whether a predetermined transmission timing cycle is reached (step A2). The control portion 4 may determine that the predetermined transmission timing cycle is reached (YES at step A2). The predetermined transmission timing cycle is equivalent to a specified cycle according to the disclosure and represents one second, for example. The control portion 4 then outputs a sniff mode release instruction to the BT module 5 (step A3). The control portion 4 terminates the profile connection monitoring process and returns to the main process.

In the onboard apparatus 2, the BT module 5 changes the main process to the sniff mode release instruction input process and starts it. The BT module 5 determines whether a specific profile (e.g., SPP) is connected to the BT module 24 (step B1). The BT module 5 may determine that a specific profile is connected to the BT module 24 (YES at step B1). The BT module 5 then determines whether the control portion 4 entered a sniff mode release instruction (step B2). The BT module 5 may determine that the control portion 4 entered the sniff mode release instruction (YES at step SB2). The BT module 5 then turns on a transmission wait flag indicating wait for transmission of the sniff mode release signal (step B3). The BT module 5 terminates the sniff mode release instruction input process and returns to the main process.

The BT module 5 changes the main process to the sniff mode release signal transmission process and starts it. The BT module 5 determines whether a specific profile (e.g., SPP) is connected to the BT module 24 (step B11). The BT module 5 may determine that a specific profile is connected to the BT module 24 (YES at step B11). The BT module 5 then determines whether the transmission wait flag turns on (step B12). That is, the BT module 5 determines whether the control portion 4 enters the sniff mode release instruction and is ready for transmission of the sniff mode release signal.

The BT module 5 may determine that the transmission wait flag turns on so as to be ready for transmission of the sniff mode release signal (YES at step B12). The BT module 5 then transmits the sniff mode release signal to the BT module 24 via the BT communication line (step B13) and turns off the transmission wait flag (step B14). The BT module 5 terminates the sniff mode release signal transmission process and returns to the main process.

In the mobile telephone 3, the BT module 24 changes the main process to the sniff mode release signal reception process and starts it. The BT module 24 determines whether the sniff mode release signal is received from the BT module 5 via the BT communication line (step C1). The BT module 24 may determine that the sniff mode release signal is received from the BT module 5 via the BT communication line (YES at step C1). The BT module 24 determines whether the sniff mode is active (step C2). The BT module 24 may determine that the sniff mode is active (YES at step C2). The BT module 24 then changes the sniff mode to the normal mode or releases the sniff mode (step C3). The BT module 24 terminates the sniff mode release signal reception process and returns to the main process.

The control portion 4 repeatedly performs the above-mentioned sequence of processes and allows the BT module 5 to transmit the sniff mode release signal to the BT module 24 at the predetermined transmission timing cycle. The control portion 4 allows the BT module 24 operating in the sniff mode to transition to the normal mode. That is, the control portion 4 can fast change the BT module 24 operating in the sniff mode to the normal mode. If the BT module 24 is operating in the normal mode, the control portion 4 allows the BT module 5 to repeatedly transmit the sniff mode release signal to the BT module 24. The control portion 4 can thus prevent the BT module 24 from transitioning to the sniff mode from the normal mode.

In this case, the control portion 4 may configure the transmission timing cycle based on the quantity of data transmitted to the BT module 24 from the BT module 5. The control portion 4 relatively shortens the transmission timing cycle if a relatively large quantity of data, that is, more data than specified is transmitted from the BT module 5 to the BT module 24. The control portion 4 advances the timing for the BT module 24 to transition to the normal mode from the sniff mode and allows the BT module 24 to operate in the normal mode as long as possible. On the other hand, the control portion 4 relatively lengthens the transmission timing cycle if a relatively small quantity of data, that is, less data than specified is transmitted from the BT module 5 to the BT module 24. The control portion 4 delays the timing for the BT module 24 to transition to the normal mode from the sniff mode and allows the BT module 24 to operate in the sniff mode as long as possible. A decrease in the data communication rate causes a relatively large effect if the BT module 5 transmits the specified quantity of data or more to the BT module 24. Operating the BT module 24 in the normal mode as long as possible prevents a delay in the data communication. On the other hand, a decrease in the data communication rate causes a relatively small effect if the BT module 5 transmits data smaller than the specified quantity of data to the BT module 24. Operating the BT module 24 in the sniff mode as long as possible suppresses power consumption of the mobile telephone 3.

(2) A specific profile is connected between the BT modules 5 and 24 and the BT module 24 is operating in the sniff mode (see FIGS. 3 and 4).

In this case, the BT module 5 of the onboard apparatus 2 periodically performs a state acquisition process at a specified cycle in addition to the sniff mode release instruction input process and the sniff mode release signal transmission process as sub-processes of the main process. The BT module 24 of the mobile telephone 3 periodically performs a state notification process at a specified cycle in addition to the sniff mode release signal reception process as sub-processes of the main process.

In the mobile telephone 3, the BT module 24 changes the main process to the state notification process and starts it. The BT module 24 determines whether the sniff mode is active (step C21). The BT module 24 may determine that the sniff mode is active (YES at step C21). The BT module 24 then transmits a sniff mode in-process signal to the BT module 5 via the BT communication line (step C22). The sniff mode in-process signal indicates that the sniff mode is active. The BT module 24 terminates the state notification process and returns to the main process.

In the onboard apparatus 2, the BT module 5 changes the main process to the state acquisition process and starts it. The BT module 5 determines whether a specific profile (e.g., SPP) is connected to the BT module 24 (step B21). The BT module 5 may determine that a specific profile is connected to the BT module 24 of the mobile telephone 3 (YES at step B21). The BT module 5 then determines whether the sniff mode in-process signal is received from the BT module 24 via the BT communication line (step B22). The BT module 5 may determine that the sniff mode in-process signal is received from the BT module 24 via the BT communication line (YES at step B22). The BT module 5 then outputs the received sniff mode in-process signal to the control portion 4 (step B23). The BT module 5 terminates the state acquisition process and returns to the main process.

The control portion 4 changes the main process to the profile connection monitoring process and starts it to check the profile connection state of the BT module 5. The control portion 4 determines whether a specific profile (e.g., SPP) is connected between the BT modules 5 and 24 (step A21). The control portion 4 may determine that a specific profile is connected between the BT modules 5 and 24 (YES at step A21). The control portion 4 then determines whether the sniff mode in-process signal is entered from the BT module 5 (step A22). The control portion 4 may determine that the sniff mode in-process signal is entered from the BT module 5 (YES at step A22). The control portion 4 then outputs the sniff mode release instruction to the BT module 5 (step A23). The control portion 4 terminates the profile connection monitoring process and returns to the main process.

The BT module 5 changes the main process to the sniff mode release instruction input process and starts it. The BT module 5 then performs steps B1 through B3 in (1) described above. The BT module 5 changes the main process to the sniff mode release signal transmission process and starts it. The BT module 5 then performs steps B11 through B14 in (1) described above.

In the mobile telephone 3, the BT module 24 changes the main process to the sniff mode release signal reception process and starts it. The BT module 24 may determine that the sniff mode release signal is received from the BT module 5 (YES at step C31). The BT module 24 then transitions from the sniff mode to the normal mode without determining whether the sniff mode is active (step C32). This process differs from that described in (1) above. The BT module 24 terminates the sniff mode release signal reception process and returns to the main process.

The control portion 4 repeatedly performs the above-mentioned sequence of processes and determines that the BT module 24 is operating in the sniff mode. The control portion 4 then allows the BT module 5 to transmit the sniff mode release signal to the BT module 24. The control portion 4 thus allows the BT module 24 operating in the sniff mode to transition to the normal mode.

There has been described the case where the BT module 24 explicitly transmits the sniff mode in-process signal indicating operation in the sniff mode to the BT module 5. In addition, the control portion 4 may allow the BT module 5 to transmit a state inquiry signal to the BT module 24. The state inquiry signal inquires whether the BT module 24 is operating in the sniff mode or the normal mode. The sniff mode in-process signal indicates that the BT module 24 is operating in the sniff mode. The normal mode in-process signal indicates that the BT module 24 is operating in the normal mode. The control portion 4 may allow the BT module 5 to receive the sniff mode in-process signal or the normal mode in-process signal from the BT module 24. The control portion 4 may determine whether the BT module 24 is operating in the sniff mode or the normal mode. The BT module 5 may transmit the sniff mode release signal to the BT module 24 via the BT communication line (step B13) immediately after determining that the sniff mode in-process signal is received from the BT module 24 (YES at step B22).

(3) A specific profile is connected between the BT modules 5 and 24 and the BT module 24 transitions from the normal mode to the sniff mode (see FIG. 5).

Also in this case, the BT module 5 of the onboard apparatus 2 periodically performs the state acquisition process at a specified cycle in addition to the sniff mode release instruction input process and the sniff mode release signal transmission process as sub-processes of the main process. The BT module 24 of the mobile telephone 3 periodically performs the state notification process at a specified cycle in addition to the sniff mode release signal reception process as sub-processes of the main process.

In the mobile telephone 3, the BT module 24 changes the main process to the state notification process and starts it. The BT module 24 determines whether the normal mode transitions to the sniff mode (step C41). The BT module 24 may determine that the normal mode transitions to the sniff mode (YES at step C41). The BT module 24 then transmits a sniff mode transition signal to the BT module 5 via the BT communication line (step C42). The BT module 24 terminates the state notification process and returns to the main process.

In the onboard apparatus 2, the BT module 5 changes the main process to the state acquisition process and starts it. The BT module 5 determines whether a specific profile (e.g., SPP) is connected to the BT module 24 (step B41). The BT module 5 may determine that a specific profile is connected to the BT module 24 of the mobile telephone 3 (YES at step B41). The BT module 5 then determines whether the sniff mode transition signal is received from the BT module 24 via the BT communication line (step B42). The BT module 5 may determine that the sniff mode transition signal is received from the BT module 24 via the BT communication line (YES at step B42). The BT module 5 then outputs the received sniff mode transition signal to the control portion 4 (step B43). The BT module 5 terminates the state acquisition process and returns to the main process.

The control portion 4 changes the main process to the profile connection monitoring process and starts it to check the profile connection state of the BT module 5. The control portion 4 determines whether a specific profile (e.g., SPP) is connected between the BT modules 5 and 24 (step A41). The control portion 4 may determine that a specific profile is connected between the BT modules 5 and 24 (YES at step A41). The control portion 4 then determines whether the sniff mode transition signal is entered from the BT module 5 (step A42). The control portion 4 may determine that the sniff mode transition signal is entered from the BT module 5 (YES at step A42). The control portion 4 then outputs the sniff mode release instruction to the BT module 5 (step A43). The control portion 4 terminates the profile connection monitoring process and returns to the main process.

The BT module 5 changes the main process to the sniff mode release instruction input process and starts it. The BT module 5 then performs steps B1 through B3 in (1) described above. The BT module 5 changes the main process to the sniff mode release signal transmission process and starts it. The BT module 5 then performs steps B11 through B14 in (1) described above (see FIG. 4).

In the mobile telephone 3, the BT module 24 changes the main process to the sniff mode release signal reception process and starts it. The BT module 24 then performs steps C31 and C32 in (2) described above (see FIG. 4).

The control portion 4 repeatedly performs the above-mentioned sequence of processes and determines that the BT module 24 transitions from the normal mode to the sniff mode. The control portion 4 then allows the BT module 5 to transmit the sniff mode release signal to the BT module 24. The control portion 4 thus allows the BT module 24 operating in the sniff mode to transition to the normal mode. The BT module 5 may transmit the sniff mode release signal to the BT module 24 via the BT communication line (step B13) immediately after determining that the sniff mode transition signal is received from the BT module 24 via the BT communication line (YES at step B42).

(4) A specific profile is connected between the BT modules 5 and 24 and data communication is performed between the BT modules 5 and 24 or no data communication does not exceed a predetermined period (see FIG. 6).

In the onboard apparatus 2, the control portion 4 changes the main process to the profile connection monitoring process and starts it to check the profile connection state of the BT module 5. The control portion 4 determines whether a specific profile (e.g., SPP) is connected between the BT modules 5 and 24 (step A51). The control portion 4 may determine that a specific profile is connected between the BT modules 5 and 24 (YES at step A51). The control portion 4 then determines whether data communication is in progress between the BT modules 5 and 24 (step A52). In this case, the control portion 4 determines the data communication in progress even if data is exchanged between the BT modules 5 and 24 and a user operation causes data to be exchanged between the BT modules 5 and 24, for example.

The control portion 4 may determine that the data communication is in progress between the BT modules 5 and 24 (YES at step A52). The control portion 4 then outputs the sniff mode release instruction to the BT module 5 (step A54). The control portion 4 terminates the profile connection monitoring process and returns to the main process. The control portion 4 may determine that no data communication is in progress between the BT modules 5 and 24 (NO at step A52). The control portion 4 then determines whether no data communication exceeds a predetermined period between the BT modules 5 and 24 (step A53). The control portion 4 may determine that no data communication does not exceed a predetermined period between the BT modules 5 and 24 (NO at step A53). Also in this case, the control portion 4 outputs the sniff mode release instruction to the BT module 5 (step A54). The control portion 4 terminates the profile connection monitoring process and returns to the main process. The control portion 4 may determine that no data communication exceeds a predetermined period between the BT modules 5 and 24 (YES at step A53). In this case, the control portion 4 does not output the sniff mode release instruction to the BT module 5.

The BT module 5 changes the main process to the sniff mode release instruction input process and starts it. The BT module 5 then performs steps B1 through B3 in (1) described above. The BT module 5 changes the main process to the sniff mode release signal transmission process and starts it. The BT module 5 then performs steps B11 through B14 in (1) described above (see FIGS. 2A AND 2B).

In the mobile telephone 3, the BT module 24 changes the main process to the sniff mode release signal reception process and starts it. The BT module 24 then performs steps C1 and C3 in (1) described above (see FIGS. 2A AND 2B).

The control portion 4 repeatedly performs the above-mentioned sequence of processes. The control portion 4 may then determine that the data communication is in progress between the BT modules 5 and 24. Alternatively, the control portion 4 may determine that no data communication does not exceed the predetermined period. In such a case, the control portion 4 allows the BT module 5 to transmit the sniff mode release signal to the BT module 24.

The control portion 4 thus allows the BT module 24 operating in the sniff mode to transition to the normal mode. The control portion 4 may determine that no data communication between the BT modules 5 and 24 exceeds the predetermined period. In this case, the control portion 4 prevents the BT module 5 from transmitting the sniff mode release signal to the BT module 24. The control portion 4 thus maintains the BT module 24 in the sniff mode and suppresses the power consumption of the BT module 24 for energy saving.

Figure 7:
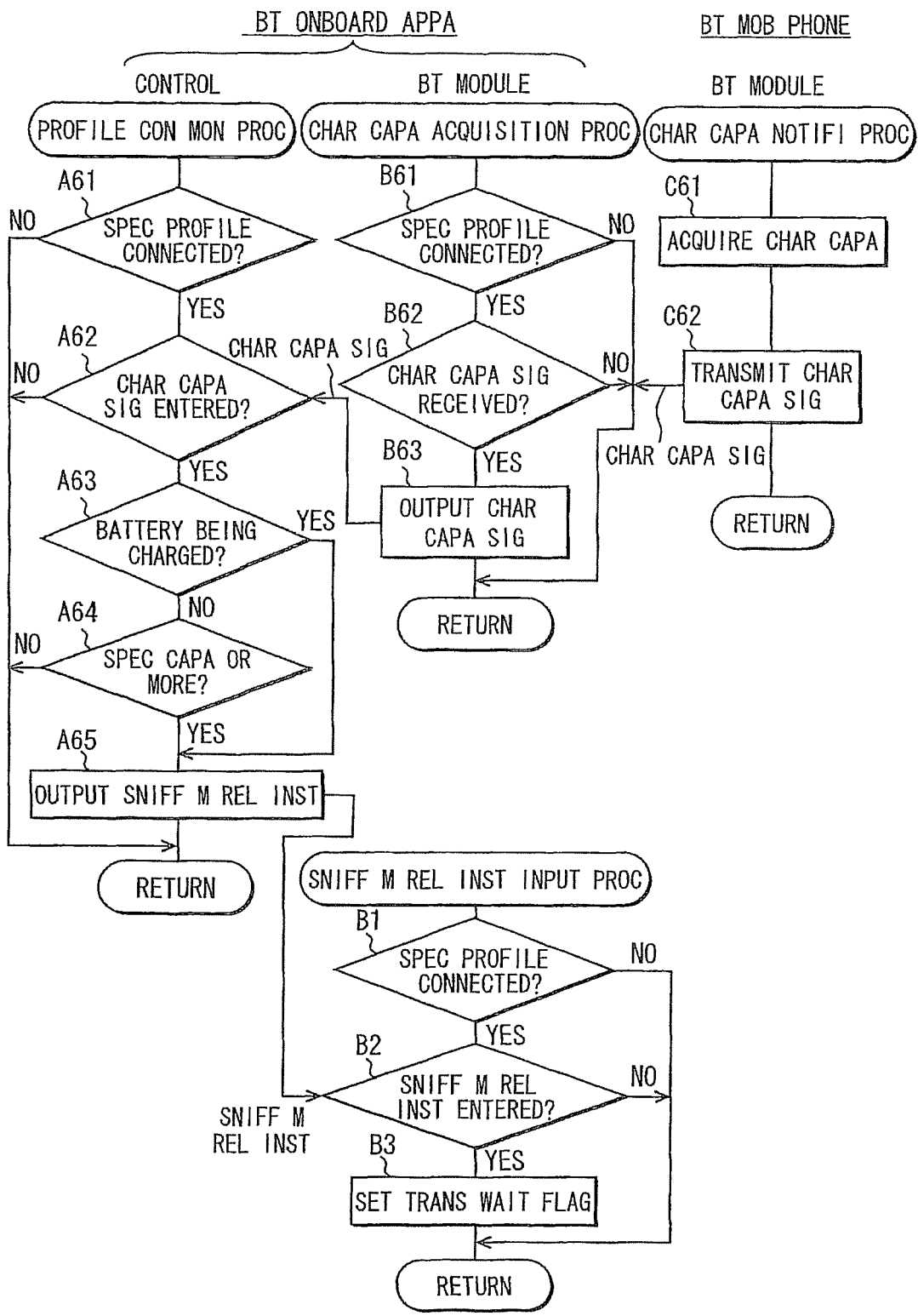
FIG. 7 is another flowchart showing processes performed by an onboard apparatus and a mobile telephone.

(5) A specific profile is connected between the BT modules 5 and 24 and the battery 32 of the mobile telephone 3 is being charged or the battery 32 thereof satisfies a predetermined charging capacity or more (see FIG. 7).

In this case, the BT module 5 of the onboard apparatus 2 periodically performs a charging capacity acquisition process at a specified cycle in addition to the sniff mode release instruction input process and the sniff mode release signal transmission process as sub-processes of the main process. The BT module 24 of the mobile telephone 3 periodically performs a charging capacity notification process at a specified cycle in addition to the sniff mode release signal reception process as sub-processes of the main process.

In the mobile telephone 3, the BT module 24 changes the main process to the charging capacity notification process and starts it. The BT module 24 acquires the most recent charging capacity of the battery 32 from the control portion 22 (step C61) after the control portion 22 detects that charging capacity. The BT module 24 transmits a charging capacity signal indicating the acquired charging capacity to the BT module 5 (step C62). The BT module 24 terminates the charging capacity notification process and returns to the main process.

In the onboard apparatus 2, the BT module 5 changes the main process to the charging capacity acquisition process and starts it. The BT module 5 determines whether a specific profile (e.g., SPP) is connected to the BT module 24 (step B61). The BT module 5 may determine that a specific profile is connected to the BT module 24 of the mobile telephone 3 (YES at step B61). The BT module 5 then determines whether the charging capacity signal is received from the BT module 24 (step B62). The BT module 5 may determine that the charging capacity signal is received from the BT module 24 (YES at step B62). The BT module 5 then outputs the received charging capacity signal to the control portion 4 (step B63). The BT module 5 terminates the charging capacity acquisition process and returns to the main process.

The control portion 4 changes the main process to the profile connection monitoring process and starts it to check the profile connection state of the BT module 5. The control portion 4 determines whether a specific profile (e.g., SPP) is connected between the BT modules 5 and 24 (step A61). The control portion 4 may determine that a specific profile is connected between the BT modules 5 and 24 (YES at step A61). The control portion 4 then determines whether the charging capacity signal is input from the BT module 5 (step A62). The control portion 4 may determine that the charging capacity signal is input from the BT module 5 (YES at step A62). The control portion 4 then determines whether the battery 32 is being charged based on the input charging capacity signal (step A63).

The control portion 4 may determine that the battery 32 is chronologically increasing its charging capacity and is being charged (YES at step A63). The control portion 4 outputs the sniff mode release instruction to the BT module 5 (step A65). The control portion 4 terminates the profile connection monitoring process and returns to the main process.

The control portion 4 may determine that the battery 32 is not chronologically increasing its charging capacity and is not being charged (NO at step A63). The control portion 4 then determines whether the charging capacity of the battery 32 is greater than or equal to a specified capacity, e.g., 80% of the full charge (step A64). The control portion 4 may determine that the charging capacity of the battery 32 is greater than or equal to a specified capacity (YES at step A64). Also in this case, the control portion 4 outputs the sniff mode release instruction to the BT module 5 (step A65). The control portion 4 terminates the profile connection monitoring process and returns to the main process. The control portion 4 may determine that the charging capacity of the battery 32 is not greater than or equal to a specified capacity (NO at step A64). The control portion 4 does not output the sniff mode release instruction to the BT module 5.

The BT module 5 changes the main process to the sniff mode release instruction input process and starts it. The BT module 5 then performs steps B1 through B3 in (1) described above. The BT module 5 changes the main process to the sniff mode release signal transmission process and starts it. The BT module 5 then performs steps B11 through B14 in (1) described above (see FIGS. 2A AND 2B).

In the mobile telephone 3, the BT module 24 changes the main process to the sniff mode release signal reception process and starts it. The BT module 24 then performs steps C1 and C3 in (1) described above (see FIGS. 2A AND 2B).

The control portion 4 repeatedly performs the above-mentioned sequence of processes. The control portion 4 may then determine that the battery 32 is being charged or the charging capacity of the battery 32 is larger than or equal to the specified capacity. The control portion 4 then allows the BT module 5 to transmit the sniff mode release signal to the BT module 24. The control portion 4 thus allows the BT module 24 operating in the sniff mode to transition to the normal mode. The control portion 4 may determine that the battery 32 is not being charged and the charging capacity of the battery 32 is not larger than or equal to the specified capacity. In this case, the control portion 4 prevents the BT module 5 from transmitting the sniff mode release signal to the BT module 24. The control portion 4 thus maintains the BT module 24 in the sniff mode and suppresses the power consumption of the BT module 24 for energy saving.

There has been described the case where the BT module 24 explicitly transmits the charging capacity signal indicating the charging capacity to the BT module 5. To determine the charging capacity of the battery 32, the control portion 4 may allow the BT module 5 to transmit a charging capacity inquiry signal to the BT module 24 and allows the BT module 5 to receive the charging capacity signal from the BT module 24. The charging capacity inquiry signal inquires into the charging capacity of the battery 32. Upon determining that the battery 32 is not being charged, the control portion 4 may prevent the BT module 5 from transmitting the sniff mode release signal to the BT module 24 regardless of the charging capacity of the battery 32. The control portion 4 may thus maintain the BT module 24 in the sniff mode and suppress the power consumption of the BT module 24. To determine that the battery 32 is being charged, the control portion 4 may determine that the USB communication line is connected between the USB module 6 and the USB module 25 of the mobile telephone 3.

The control portion 4 may allow the BT module 5 to transmit the sniff mode release signal to the BT module 24 according to combinations of the successful conditions described (1) through (5) above. For example, the conditions (2) and (4) may be combined. In this case, the control portion 4 determines that the sniff mode in-process signal is supplied from the BT module 5 and that the data communication is in progress between the BT modules 5 and 24. Alternatively, the control portion 4 determines that no data communication does not exceed the predetermined period. The control portion 4 may then output the sniff mode release instruction to the BT module 5 and allow the BT module 24 operating in the sniff mode to transition to the normal mode from the sniff mode.

Further, the conditions (2) and (5) may be combined. In this case, the control portion 4 determines that the sniff mode in-process signal is supplied from the BT module 5 and that the battery 32 is being charged. Alternatively, the control portion 4 determines that the charging capacity of the battery 32 is larger than or equal to the specified capacity. The control portion 4 may then output the sniff mode release instruction to the BT module 5 and allow the BT module 24 operating in the sniff mode to transition to the normal mode from the sniff mode.

There has been described the case where the BT module 24 operates in the sniff mode as the power-saving mode, receives the sniff mode release signal while operating in the sniff mode, and then transitions to the normal mode from the sniff mode. The same applies to a case where the BT module 24 operates in the park mode or the hold mode as the power-saving mode. While operating in the park mode, the BT module 24 may transition to the normal mode from the park mode when the BT module 24 receives a park mode release signal. While operating in the hold mode, the BT module 24 may transition to the normal mode from the hold mode when the BT module 24 receives a hold mode release signal.

According to the embodiment as described above, the BT module 5 of the onboard apparatus 2 transmits the sniff mode release signal to the BT module 24 of the mobile telephone 3 as a data communication party while a specific profile is connected between the BT modules 5 and 24. Even if the BT module 24 as a data communication party is operating in the sniff mode, the BT module 24 can fast transition (return) to the normal mode from the sniff mode and operate in the normal mode. As a result, this enables to fast solve a problem if it occurs due to the BT module 24 operating in the sniff mode. This also enables to prevent such a problem from occurring.

A fast response to a user operation is available if SPP is used as the above-mentioned specific profile and is connected between the BT modules 5 and 24. The onboard apparatus 2 can fast notify the user of call termination from the communication network 33 to the mobile telephone 3 if HFP is used as the specific profile and is connected between the BT modules 5 and 24. The onboard apparatus 2 can fast notify the user of e-mail arrival from the communication network 33 to the mobile telephone 3 if MAP is used as the specific profile and is connected between the BT modules 5 and 24.

Data needed for dial-up connection can be fast exchanged between the BT modules 5 and 24 to fast complete the dial-up connection if DUN is used as the specific profile and is connected between the BT modules 5 an 24. Fast terminating the dial-up connection can improve the effect on user cost in terms of the usage-based rate that charges the user in accordance with the connection time of a wide-area communication line between the telephone communication portion 23 and the communication network 33.

The disclosure is not limited to the above-mentioned embodiment but can be modified or enhanced as follows.

The short range wireless communication apparatus is not limited to the onboard apparatus 2 and just needs to include a BT module having the function equivalent to the BT module 5. Accordingly, the short range wireless communication apparatus may be equivalent to a navigation system having known navigation functions and may not be mounted on a vehicle. The communication-party apparatus as a data communication party for the short range wireless communication apparatus is not limited to the mobile telephone 3 and just needs to include a BT module having the function equivalent to the BT module 24. Accordingly, the communication-party apparatus may be a mobile information terminal or a stationary terminal the user cannot carry.

According to the above-mentioned description, the control portion 4 in the onboard apparatus 2 determines whether the transmission timing cycle is reached, whether the data communication is in progress between the BT modules 5 and 24, and whether the battery 32 is being charged. Instead, the BT module 5 may perform these determination processes.

According to the embodiment, the control portion 4 allows the BT module 5 to transmit the sniff mode release signal to the BT module 24 while SPP, HFP, MAP, or DUN is connected between the BT modules 5 and 24. This is also applicable while the BT modules 5 and 24 connect therebetween a profile that might cause a problem due to the sniff-mode operation. For example, the control portion 4 allows the BT module 5 to transmit the sniff mode release signal to the BT module 24 while PBAP or OPP is connected between the BT modules 5 and 24.

The above disclosure has the following aspects.

According to an aspect of the present disclosure, a short range wireless communication apparatus includes: a connection device that connects with an external apparatus via a short range wireless communication line according to a data communication protocol for defining data communication, wherein the external apparatus switches to a normal mode from a power-saving mode under a condition that the external apparatus receives a power-saving mode release signal from the short range wireless communication apparatus while the external apparatus operates in the power-saving mode; a transmission device that transmits the power-saving mode release signal to the external apparatus; and a control device that controls the transmission device to transmit the power-saving mode release signal to the external apparatus when the control device determines that the connection device connects with the external apparatus according to the data communication protocol.

In the above apparatus, the power-saving mode release signal is transmitted while the data communication protocol is connected between the connection device and the external apparatus as a communication-party apparatus, that is, while data communication is likely to occur between both based on the data communication protocol. Even if the external apparatus as a data communication party is operating in the power-saving mode, the external apparatus can fast transition (return) to the normal mode from the power-saving mode and operate in the normal mode. As a result, this enables to fast solve a problem if occurred due to the external apparatus operating in the power-saving mode.

Alternatively, the control device may control the transmission device to repeatedly transmit the power-saving mode release signal to the external apparatus at a predetermined cycle when the control device determines that the connection device connects with the external apparatus according to the data communication protocol. In this case, setting a specified cycle can repeatedly transmit the power-saving mode release signal at the specified cycle. This enables the external apparatus operating in the power-saving mode to transition to the normal mode from the power-saving mode at the specified cycle.

Alternatively, the control device may set the predetermined cycle based on an amount of data transmitted from the connection device to the external apparatus when data communication is performed between the connection device and the external apparatus. In this case, a specified cycle is configured based on the quantity of data transmitted from the connection device to the external apparatus. This enables the power-saving mode release signal to be transmitted at the specified cycle based on the quantity of data. This also enables the external apparatus operating in the power-saving mode to transition to the normal mode from the power-saving mode at the specified cycle based on the quantity of data.

Alternatively, the control device may control the transmission device to transmit the power-saving mode release signal to the external apparatus when the control device determines that the connection device connects with the external apparatus according to the data communication protocol, and the external apparatus operates in the power-saving mode. In this case, the power-saving mode release signal is transmitted under the condition that the external apparatus is operating in the power-saving mode. The external apparatus operating in the power-saving mode can transition to the normal mode from the power-saving mode. This can prevent the power-saving mode release signal from being transmitted though it need not be transmitted because the external apparatus is operating in the normal mode (not in the power-saving mode). This can also prevent unnecessary consumption of a band needed to transmit the power-saving mode release signal.

Alternatively, the control device may control the transmission device to transmit the power-saving mode release signal to the external apparatus when the control device determines that the connection device connects with the external apparatus according to the data communication protocol, and the external apparatus switches to the power-saving mode from the normal mode. In this case, the power-saving mode release signal is transmitted under the condition that the external apparatus transitions to the power-saving mode from the normal mode. The external apparatus operating in the power-saving mode can transition to the normal mode from the power-saving mode. Similarly, this can prevent the power-saving mode release signal from being transmitted though it need not be transmitted because the external apparatus is operating in the normal mode (not in the power-saving mode). This can also prevent unnecessary consumption of a band needed to transmit the power-saving mode release signal. In this case, the power-saving mode release signal is transmitted immediately after the external apparatus transitions to the power-saving mode from the normal mode. This can minimize a period during which the external apparatus operates in the power-saving mode.

Alternatively, the control device may control the transmission device to transmit the power-saving mode release signal to the external apparatus when the control device determines that the connection device connects with the external apparatus according to the data communication protocol, and data communication is in progress between the connection device and the external apparatus. In this case, the power-saving mode release signal is transmitted under the condition that data communication is in progress between the connection device as a connection portion and the external apparatus. This enables the external apparatus as a data communication party to fast transition to the normal mode from the power-saving mode even if the external apparatus is performing data communication in the power-saving mode. For example, it is possible to fast solve a problem such as a decreased data communication rate due to an operation in the power-saving mode.

Alternatively, the control device may control the transmission device to transmit the power-saving mode release signal to the external apparatus when the control device determines that the connection device connects with the external apparatus according to the data communication protocol, and a period, in which the data communication is not in progress between the connection device and the external apparatus, does not exceed a predetermined period even though the data communication is not in progress between the connection device and the external apparatus. In this case, the power-saving mode release signal is transmitted under the condition that no data communication between the connection device and the external apparatus does not exceed a predetermined period. For example, the user may temporarily stop operation input and accordingly pause the data communication even if the external apparatus as a data communication party is operating in the power-saving mode. The external apparatus can fast transition to the normal mode from the power-saving mode even if no data communication for the external apparatus does not exceed a predetermined period. For example, this can fast solve a problem such as a decreased data communication rate immediately after the data communication restarts in response to restarted operation input by the user.

Alternatively, the control device may control the transmission device not to transmit the power-saving mode release signal to the external apparatus when the control device determines that the connection device connects with the external apparatus according to the data communication protocol, and a period, in which the data communication is not in progress between the connection device and the external apparatus, exceeds a predetermined period even though the data communication is not in progress between the connection device and the external apparatus. In this case, when not performing data communication, the external apparatus remains in the power-saving mode if no data communication between the connection device and the external apparatus exceeds a predetermined period. This can suppress power consumption in the external apparatus.

Alternatively, the control device may control the transmission device to transmit the power-saving mode release signal to the external apparatus when the control device determines that the connection device connects with the external apparatus according to the data communication protocol, and the external apparatus is being charged. In this case, the power-saving mode release signal is transmitted under the condition that the external apparatus is being charged. This can allow the external apparatus to transition to the normal mode from the power-saving mode. The external apparatus can operate in the normal mode as long as possible if the operating power for the external apparatus is ensured.

Alternatively, the control device may control the transmission device not to transmit the power-saving mode release signal to the external apparatus when the control device determines that the external apparatus is not being charged even though the connection device connects with the external apparatus according to the data communication protocol. In this case, the external apparatus remains in the power-saving mode if the external apparatus is not being charged. This can suppress power consumption in the external apparatus.

Alternatively, the control device may control the transmission portion to transmit the power-saving mode release signal to the external apparatus when the control device determines that the connection device connects with the external apparatus according to the data communication protocol, and a charging amount of the external apparatus is equal to or larger than a predetermined charging amount. In his case, transmitting the power-saving mode release signal allows the external apparatus to transition to the normal mode to the power-saving mode under the condition that the external apparatus indicates a specified charging capacity or more. Similarly, the external apparatus can operate in the normal mode as long as possible if the operating power for the external apparatus is ensured.

Alternatively, the control device may control the transmission device not to transmit the power-saving mode release signal to the external apparatus when the control device determines that the charging amount of the external apparatus is smaller than the predetermined charging amount even though the connection device connects with the external apparatus according to the data communication protocol. In this case, the external apparatus remains in the power-saving mode if the external apparatus indicates less than a specified charging capacity. This can suppress power consumption in the external apparatus.

Alternatively, the data communication protocol may define at least one of data communication concerning data related to a user operation, data communication concerning data notifying an incoming call to the external apparatus from a communication network, and data communication concerning data necessary for the external apparatus to connect with the communication network. In this case, the data communication protocol to be connected can specify data communication concerning data related to a user operation. In this case, the data communication protocol can increase the data communication rate concerning data in response to the user operation. A fast response to a user operation is available. The data communication protocol to be connected can specify data communication concerning data notifying call termination to the external apparatus from a communication network. In this case, the data communication protocol can increase the data communication rate concerning data notifying call termination to the external apparatus from the communication network. The user can be fast notified of the termination to the external apparatus from the communication network. The data communication protocol to be connected can specify data communication concerning data needed for the external apparatus to connect with a communication network. In this case, the data communication protocol can increase the data communication rate concerning data needed for the external apparatus to connect with the communication network.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A short range wireless communication apparatus comprising:
    a connection device that connects with a communication-party apparatus via a short range wireless communication line according to a data communication protocol for defining data communication, wherein the communication-party apparatus switches to a normal mode from a power-saving mode under a condition that the communication-party apparatus receives a power-saving mode release signal from the short range wireless communication apparatus while the communication-party apparatus operates in the power-saving mode;
    a transmission device that transmits the power-saving mode release signal to the communication-party apparatus; and
    a control device that controls the transmission device to transmit the power-saving mode release signal to the communication-party apparatus when the control device determines that the connection device connects with the communication-party apparatus according to the data communication protocol,
    wherein the control device controls the transmission device to repeatedly transmit the power-saving mode release signal to the communication-party apparatus at a predetermined cycle when the control device determines that the connection device connects with the communication-party apparatus according to the data communication protocol.

2. The short range wireless communication apparatus according to claim 1,
    wherein the control device sets the predetermined cycle based on an amount of data transmitted from the connection device to the communication-party apparatus when data communication is performed between the connection device and the communication-party apparatus.

3. The short range wireless communication apparatus according to claim 1,
    wherein the control device controls the transmission device to transmit the power-saving mode release signal to the communication-party apparatus when the control device determines that the connection device connects with the communication-party apparatus according to the data communication protocol, and the communication-party apparatus operates in the power-saving mode.

4. The short range wireless communication apparatus according to claim 1,
    wherein the data communication protocol defines at least one of data communication concerning data related to a user operation, data communication concerning data notifying an incoming call to the communication-party apparatus from a communication network, and data communication concerning data necessary for the communication-party apparatus to connect with the communication network, and
    wherein the connection device connects with the communication-party apparatus according to the data communication protocol.

5. A short range wireless communication apparatus comprising:
    a connection device that connects with a communication-party apparatus via a short range wireless communication line according to a data communication protocol for defining data communication, wherein the communication-party apparatus switches to a normal mode from a power-saving mode under a condition that the communication-party apparatus receives a power-saving mode release signal from the short range wireless communication apparatus while the communication-party apparatus operates in the power-saving mode;
    a transmission device that transmits the power-saving mode release signal to the communication-party apparatus; and
    a control device that controls the transmission device to transmit the power-saving mode release signal to the communication-party apparatus when the control device determines that the connection device connects with the communication-party apparatus according to the data communication protocol,
    wherein the control device controls the transmission device to transmit the power-saving mode release signal to the communication-party apparatus when the control device determines that the connection device connects with the communication-party apparatus according to the data communication protocol, and the communication-party apparatus switches to the power-saving mode from the normal mode.

6. A short range wireless communication apparatus comprising:
    a connection device that connects with a communication-party apparatus via a short range wireless communication line according to a data communication protocol for defining data communication, wherein the communication-party apparatus switches to a normal mode from a power-saving mode under a condition that the communication-party apparatus receives a power-saving mode release signal from the short range wireless communication apparatus while the communication-party apparatus operates in the power-saving mode;

a transmission device that transmits the power-saving mode release signal to the communication-party apparatus; and a control device that controls the transmission device to transmit the power-saving mode release signal to the communication-party apparatus when the control device determines that the connection device connects with the communication-party apparatus according to the data communication protocol, wherein the control device controls the transmission device to transmit the power-saving mode release signal to the communication-party apparatus when the control device determines that the connection device connects with the communication-party apparatus according to the data communication protocol, and data communication is in progress between the connection device and the communication-party apparatus.

7. The short range wireless communication apparatus according to claim 6, wherein the control device controls the transmission device to transmit the power-saving mode release signal to the communication-party apparatus when the control device determines that the connection device connects with the communication-party apparatus according to the data communication protocol, and a period, in which the data communication is not in progress between the connection device and the communication-party apparatus, does not exceed a predetermined period even though the data communication is not in progress between the connection device and the communication-party apparatus.

8. The short range wireless communication apparatus according to claim 6, wherein the control device controls the transmission device not to transmit the power-saving mode release signal to the communication-party apparatus when the control device determines that the connection device connects with the communication-party apparatus according to the data communication protocol, and a period, in which the data communication is not in progress between the connection device and the communication-party apparatus, exceeds a predetermined period.

9. A short range wireless communication apparatus comprising:

a connection device that connects with a communication-party apparatus via a short range wireless communication line according to a data communication protocol for defining data communication, wherein the communication-party apparatus switches to a normal mode from a power-saving mode under a condition that the communication-party apparatus receives a power-saving mode release signal from the short range wireless communication apparatus while the communication-party apparatus operates in the power-saving mode;

a transmission device that transmits the power-saving mode release signal to the communication-party apparatus; and a control device that controls the transmission device to transmit the power-saving mode release signal to the communication-party apparatus when the control device determines that the connection device connects with the communication-party apparatus according to the data communication protocol, wherein the control device controls the transmission device to transmit the power-saving mode release signal to the communication-party apparatus when the control device determines that the connection device connects with the communication-party apparatus according to the data communication protocol, and the communication-party apparatus is being charged.

10. The short range wireless communication apparatus according to claim 9, wherein the control device controls the transmission device not to transmit the power-saving mode release signal to the communication-party apparatus when the control device determines that the communication-party apparatus is not being charged even though the connection device connects with the communication-party apparatus according to the data communication protocol.

11. A short range wireless communication apparatus comprising:

a connection device that connects with a communication-party apparatus via a short range wireless communication line according to a data communication protocol for defining data communication, wherein the communication-party apparatus switches to a normal mode from a power-saving mode under a condition that the communication-party apparatus receives a power-saving mode release signal from the short range wireless communication apparatus while the communication-party apparatus operates in the power-saving mode;

a transmission device that transmits the power-saving mode release signal to the communication-party apparatus; and a control device that controls the transmission device to transmit the power-saving mode release signal to the communication-party apparatus when the control device determines that the connection device connects with the communication-party apparatus according to the data communication protocol, wherein the control device controls the transmission portion to transmit the power-saving mode release signal to the communication-party apparatus when the control device determines that the connection device connects with the communication-party apparatus according to the data communication protocol, and a charging amount of the communication-party apparatus is equal to or larger than a predetermined charging amount.

12. The short range wireless communication apparatus according to claim 11, wherein the control device controls the transmission device not to transmit the power-saving mode release signal to the communication-party apparatus when the control device determines that the charging amount of the communication-party apparatus is smaller than the predetermined charging amount even though the connection device connects with the communication-party apparatus according to the data communication protocol.

* * * * *